(12) United States Patent
Beard

(10) Patent No.: X2582
(45) Date of Patent: Apr. 30, 1816

(54) FUR, CUTTING

(76) Inventor: David Beard

David Beard
Letters Patent

The Schedule referred to in these Letters Patent and
making part of the same containing a description in the words
of the said David Beard himself of his improvement on
Ephraim [illegible] Fur Cutting Machine. — —
— Description of the Improvement —
First the master wheel 2<sup></sup>d the wheel on the shear shaft
3d the wheel on the feeding rollers the master wheel is one
third larger; the wheel on the shear shaft 2/3 larger, and the
wheel on the feeding rollers 2 inches larger in diameter
than the original machine. all so constructed as to work
with a treddle by the foot instead of the hand. Also a
slider is fixed to move between the feeding rollers and the
stock blade with a trigger to the left hand post; to push
the skin up. if it should incline down; also moved the
top feeding roller in from the centre towards the shear blades
as far as it will bear. so as for the shears to miss it: which
prevents the skin from raising too high. The improvement
on the other end of the Bench is calculated to clean the
Fur skins of the hair by two setts of rollers. one set of wood &
the other of steel. the top steel roller has a number of gro-
oves cut lengthways in it. both pairs of these rollers run
in frames made of Iron. which frames are confined togeth-
er by screws. the steel rollers are set in sliding posts of
Iron to slide within the frames above mentioned and govern-
ed by screws so as to set them nearer or further off from the
wood rollers to suit the different lengths of fur. the
steel rollers are set behind the wooden rollers and are
set higher, so that the contact of the steel rollers shall be
horizontally against the middle of the top wooden roller.
The skin is put in between the wooden rollers tail foremost
and and turned over the top roller and a pair (or more if needed) of Iron Nippers calculated with springs to make them hold fast to the edge of the skin after it is turned over the top roller. the lower ends of the nippers are made hooked so as to hang weights thereon to hold the skin tight to the top roller. so that the steel rollers shall not pull [illegible] skin with the hair. Both pair of the forementioned rollers may be worked by bands running on the first mentioned master wheel with the treddles by the foot or by cranks fixed to them as may be most convenient.

Witnesses
William Beard
John Hale

David Beard (L.S.)

Exd.
M.G.C.

unintelligible on account of the absence of E. Cutter's specification & Drawings [504 w.]